United States Patent [19]

Hihara et al.

[11] Patent Number: 5,273,679

[45] Date of Patent: Dec. 28, 1993

[54] STABILIZERS FOR COMPOSITIONS FOR ACID GAS ABSORBENT

[75] Inventors: Takeshi Hihara, Sushi; Norio Tagata, Kita; Toshimitsu Shimizu; Tetsu Matsuda, both of Yokohama; Norio Takahashi; Isamu Ueno, both of Yokosuka, all of Japan; Josif L. Leites; Julia G. Carpova, both of Moscow, Russian Federation; Tatiana V. Zhitkova, Vidnoe, Russian Federation

[73] Assignees: Toho Kagaku Kogyo Co., Ltd., Japan; State Scientific-Research and Designing Institute for Nitrogen Industry and for Products of Organic Synthesis, Russian Federation

[21] Appl. No.: 684,175

[22] Filed: Apr. 12, 1991

Related U.S. Application Data

[63] Continuation-in-part of Ser. No. 231,855, Aug. 23, 1988, abandoned.

[30] Foreign Application Priority Data

Oct. 30, 1986 [JP] Japan .................. 61-256968

[51] Int. Cl.⁵ .............................................. C01B 17/00
[52] U.S. Cl. ........................................ 95/177; 252/190; 95/235; 95/236
[58] Field of Search ................. 252/190; 55/68, 73; 423/228, 227, 226

[56] References Cited

U.S. PATENT DOCUMENTS

| | | | |
|---|---|---|---|
| 2,139,375 | 12/1938 | Millar et al. | 423/226 |
| 2,161,663 | 6/1939 | Baehr | 423/228 |
| 2,868,617 | 1/1959 | Mills | 423/226 |
| 3,956,473 | 5/1976 | Mimoun et al. | 423/226 |
| 4,145,192 | 3/1979 | Beise et al. | 423/226 |
| 4,302,220 | 11/1981 | Volkamer et al. | 55/73 X |

Primary Examiner—Robert L. Stoll
Assistant Examiner—Valerie Fee
Attorney, Agent, or Firm—Oliff & Berridge

[57] ABSTRACT

A composition for acid gas absorbent comprising:
(A): 99.99 to 70 wt % of a polyethylene glycol dimethyl ether composition represented by the following formula:

$$CH_3O(C_2H_4O)_nCH_3$$

wherein n is an integer of 1 to 10; and,
(B): 0.01 to 30 wt % of a compound containing at least one of an —NH— group, a phenolic —OH group and an —S— group in one molecule thereof but free from an alcoholic —OH group, is provided. More particularly, component B may be an amine, preferably a secondary amine, or a phenolic compound.

12 Claims, 2 Drawing Sheets

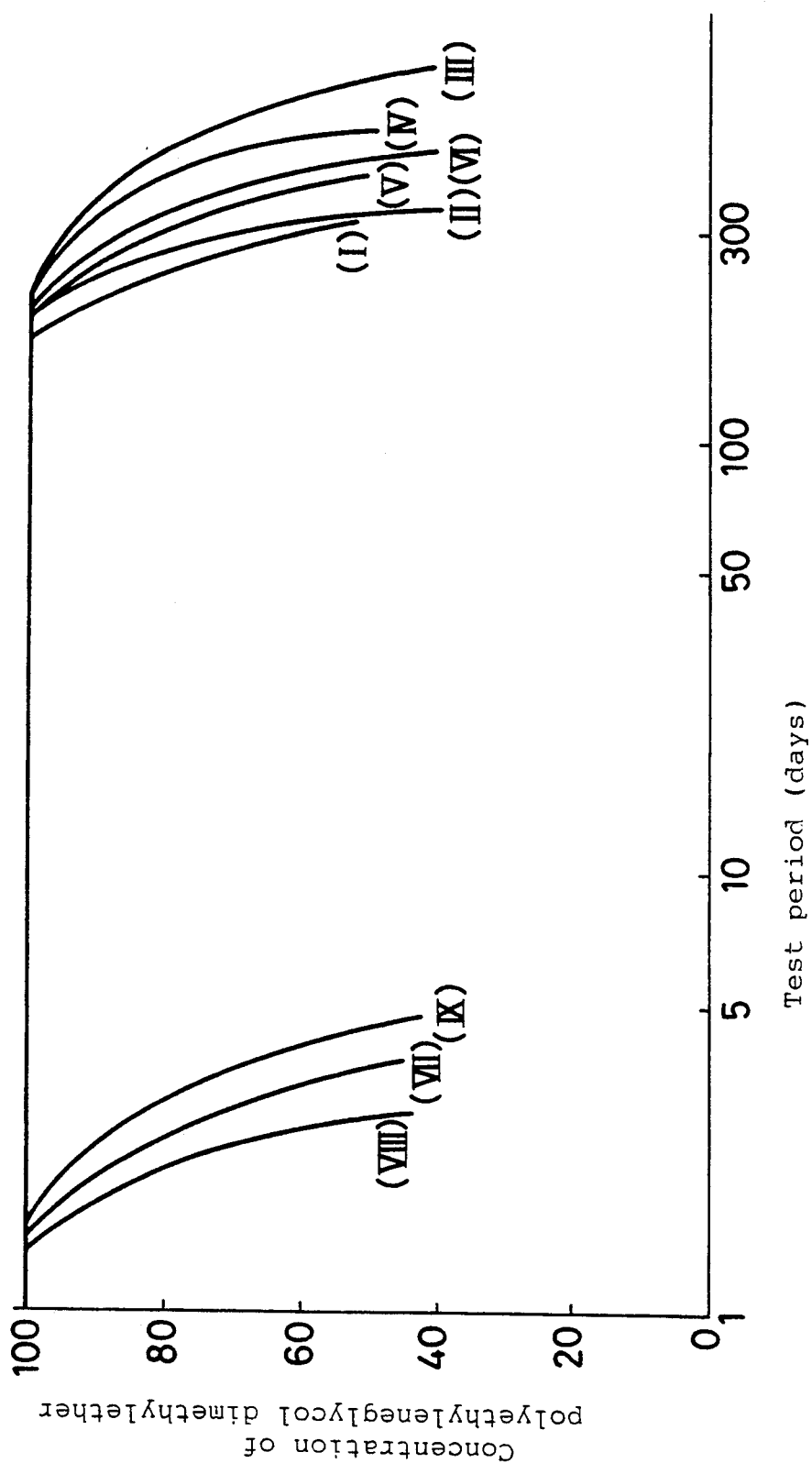

STABILIZERS FOR COMPOSITIONS FOR ACID GAS ABSORBENT

This application is a continuation-in-part of application Ser. No. 07/231,855, filed Aug. 23, 1988, now abandoned.

FIELD OF THE INVENTION

The present invention relates to compositions for acid gas absorbents comprising polyethylene glycol dimethyl ether as a main component which have excellent stability.

BACKGROUND OF THE INVENTION

Various gases such as natural gas, coke oven gas or cracked gas generated during steps of refining petroleum, etc. have been widely utilized industrially as fuels or synthetic raw materials. However, gases containing gaseous impurities, in particular, acid gases, cannot be utilized as fuels or synthetic raw materials as they are.

For example, a representative composition of natural gas is:

| hydrocarbon | 75-96 (vol %, hereafter the same) |
|---|---|
| $H_2S$ | 0-15 |
| $CO_2$ | 4-10 |
| $N_2$ | 0-0.5 |

In order to liquify natural gas, however, it is necessary that $CO_2$ and $H_2S$ be reduced to 100 ppm or less and 50 ppm or less, respectively. Further, in order to utilize natural gas as a fuel, it is indispensable to reduce $H_2S$ to 5 ppm or less. Further, in ammonia synthesis industry, various cracked gases are utilized as a source for $H_2$; for example, a representative composition of natural gas is:

| $H_2S$ | 80 (vol %, hereafter the same) |
|---|---|
| $CO_2$ | less than 1 |
| N | less than 1 |
| $CO_2$ | 19 |
| $CH_4$ | less than 1 |

In case that the cracked gas is utilized as a raw material, it is necessary that the content of $CO_2$ be reduced to 0.3% or less.

As the prior art, there are, for example, U.S. Pat. Nos. 2,649,166, 3,362,133, 3,737,392, 4,044,100 and 4,581,154, and Japanese Patent Laid-Open Application No. 156629/85. These publications teach that certain compositions of polyethylene glycol dimethyl ether are effective as chemicals for absorbing acid gases.

In particular, an absorbent of this type commercially available under the trademark of Selexol Solvent released from Norton Company in America has been utilized for operation of treating gases in various areas.

Acid gas absorbents are reproduced in a reproduction step upon contact with air or $N_2$ gas at temperatures as high as 70° C. or more and recycled to use them.

It is important that the chemicals be reproduced in the reproduction step at temperatures as high as possible thereby to minimize retention of acid gases contained in the absorbents.

This is because, as the residual gas is minimized as low as possible, an absorbing ability in an absorbing step is improved and purity of purified gas becomes high so that gas throughput capacity of the overall process can be substantially improved.

In order to achieve this object, it is indispensable to develop absorbents having excellent stability at high temperatures and such has been strongly desired in related fields.

However, acid gas absorbents disclosed heretofore cause decomposition in contact with $CO_2$ or $H_2S$ at a temperature of, for example, 100° C. and are decomposed to compounds having a poor acid gas-absorbing capability, for example, methanol, polyethylene glycol monomethyl ether, etc.

DISCLOSURE OF THE INVENTION

The stabilizers for compositions for acid gas-absorbents in accordance with the present invention can prevent this decomposition to such a degree that the decomposition is substantially ignorable and, in some cases, can prevent the decomposition completely.

The composition for acid gas absorbent of the present invention comprises:

(A) 99.99 to 70 wt % of a polyethylene glycol dimethyl ether composition represented by the following formula:

wherein n is an integer of 1 to 10; and, (B) 0.01 to 30 wt % of a compound containing at least one of an —NH— group, a phenolic —OH group and an —S— group in one compound thereof but free from a non-phenolic —OH group.

More particularly, compound B may be selected from the group consisting of amines, and is preferably a secondary amine comprising a diphenyl amine or a secondary amine represented by the following general formula:

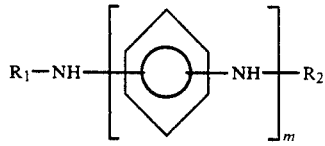

wherein $R_1$, $R_2$ are the same or different and each is either an alkyl group having 1 to 20 carbon atoms or an aryl group, m is an integer of 0, 1, 2 or 3 in which when m is 0, at least one of $R_1$ and $R_2$ is an aryl group.

Alternatively, component B may be a phenolic compound having a tert-butyl group binding to a phenyl group or a phenolic compound represented by the following general formula:

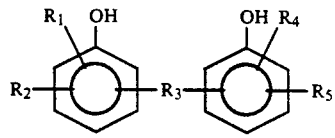

wherein $R_1$, $R_2$, $R_4$ and $R_5$ are the same or different and each represents a hydrogen atom or a group of the formula $C_xH_{(2x+1)}$, wherein x is an integer of from 1 to 7, and wherein $R_3$ is sulfur or hydrocarbon group having 1 to 10 carbon atoms.

Alternatively, component B may be a compound selected from the group consisting of thiazoles, thioureas and thiurams, or a compound indicated by one of the following formulas (1), (2) and (3):

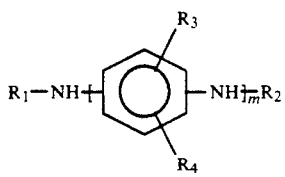

or

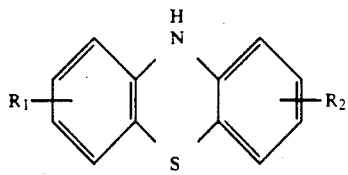

wherein $R_1$, $R_2$, $R_3$ and $R_4$ each independently represents H or hydrocarbon group having 1 to 20 C; m is an integer of 0 to 10, in cases where m=0, $R_1$ and $R_2$ each represents cyclic hydrocarbon group having 3-20 C and in cases where m=1, $R_1$ and $R_2$ each independently represents a hydrocarbon group having 1-20 carbon;

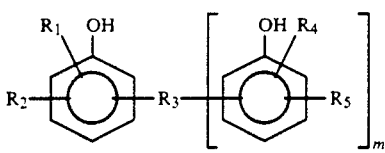

wherein $R_1$, $R_2$, $R_4$ and $R_5$ each independently represents H, hydroxyl group or hydrocarbon group having 1 to 10 C; $R_3$ represents sulfur or hydrocarbon group having 1 to 10 C; m is an integer of 0 to 2;

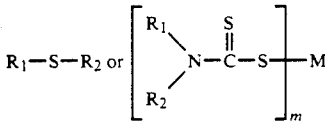

wherein $R_1$ and $R_2$ each independently represents hydrocarbon group having 1 to 8 C; M is monovalent or bivalent metal, m is an integer of 1 or 2. In particular, component B may be a compound represented by the following formula:

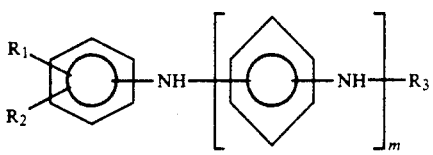

wherein $R_1$ and $R_2$ each independently represents H or alkyl group having 1 to 12 C; $R_3$ represents H or hydrocarbon having 1 to 20 C; m is an integer of 0 to 5 or a compound represented by the following formula:

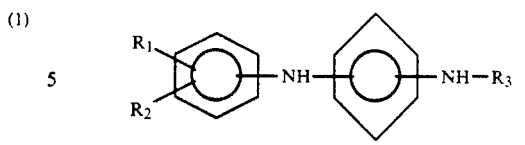

wherein $R_1$ and $R_2$ each independently represents H or alkyl group having 1 to 12 C; $R_3$ represents hydrocarbon group having 1 to 20 C. Specifically, component B may be a compound selected from the group consisting of Dibenzothiazine or derivatives thereof, N-1,3-Dimethylbutyl-N'-phenyl-p-phenylenediamine, N,N'-Di-sec-butyl-p-phenylenediamine, nonylated diphenylamine, 4,4'-Butylidenebis(6-tert-butyl-m-cresol), 2,6-Di-tert-butyl-p-cresol), 2,5-Di-tert-butylhydroquinone, p,p'-Dioctyldiphenylamine, 1,1'-Bis(4-hydroxy-phenyl)cyclohexane, Nickel dibutyl dithiocarbamate, and dilauryl-3, 3'-thiodipropionate.

Other preferred embodiments of the composition of the present invention include the following.

(i) A composition wherein component (B) is a compound containing at least one group represented by the following formula:

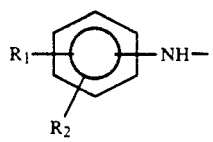

wherein $R_1$ and $R_2$ each independently represents H or an alkyl group having 1 to 12 C, in one molecule thereof.

(ii) A composition wherein component (B) is a compound containing at least one group represented by the following formula:

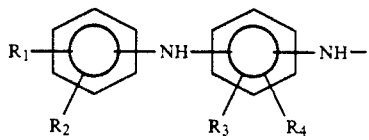

wherein $R_1$, $R_2$, $R_3$ and $R_4$ each independently represents H or an alkyl group having 1 to 12 carbon, in one molecule thereof.

(iii) A composition of (ii) described above wherein component (B) is N,N'-diphenyl-p-phenylenediamine.

(iv) A composition of (ii) described above wherein component (B) is N-isopropyl-N-phenyl-p-phenylenediamine.

The composition of polyethylene glycol dimethyl ether in accordance with the present invention which is component (A) can be prepared from the corresponding polyethylene glycol monomethyl ether composition as follows.

That is, the polyethylene glycol monomethyl ether composition is reacted with sodium (or potassium) at 130 to 170° C. to prepare a sodium (or potassium) alcoholate.

Next, the alcoholate is maintained at 100 to 130° C. and methyl chloride is added thereto to react them, whereby the dimethyl ether composition and sodium chloride (or potassium chloride) are formed. At this stage, sodium chloride (or potassium chloride) is separated and removed. The obtained dimethyl ether composition is distilled and purified to obtain the desired dimethyl ether composition.

Further as the compound of component (B) there can be used commercially available compounds of this type. Examples include Antage DP, i.e., N,N'-diphenyl-p-phenylenediamine (manufactured by Kawaguchi Chemical Industry Co., Ltd., Japan), Antage 3C, i.e., N-isopropyl-N'-phenyl-p-phenylenediamine (manufactured by Kawaguchi Chemical Industry Co., Ltd., Japan), Antage RC, i.e., 4,4'-thiobis(6-tert-butyl-m-cresol) (manufactured by Kawaguchi Chemical Industry Co., Ltd., Japan), Sumilizer 9A, i.e., alkylated diphenylamine (manufactured by Sumitomo Chemical Industry Co., Ltd., Japan), Sumilizer MXA, i.e., mixed N,N'diaryl-p-phenylene diamine (manufactured by Sumitomo Chemical Industry Co., Ltd., Japan), and Sumilizer BBM-S, i.e., 4,4'butylidene-bis-(3-methyl-6-tert-butylphenol) (manufactured by Sumitomo Chemical Industry Co., Ltd., Japan).

Of course, any compound may be effective as the compound of Component (B) of the present invention as long as it falls under the claims, but Component (B) is not deemed to be limited to the compounds listed above.

BRIEF DESCRIPTION OF THE DRAWINGS

FIG. 2 is a drawing showing results obtained by evaluation of various gas absorbents on stability at high temperature.

BEST MODE FOR PRACTICE OF THE INVENTION

Figure 1:
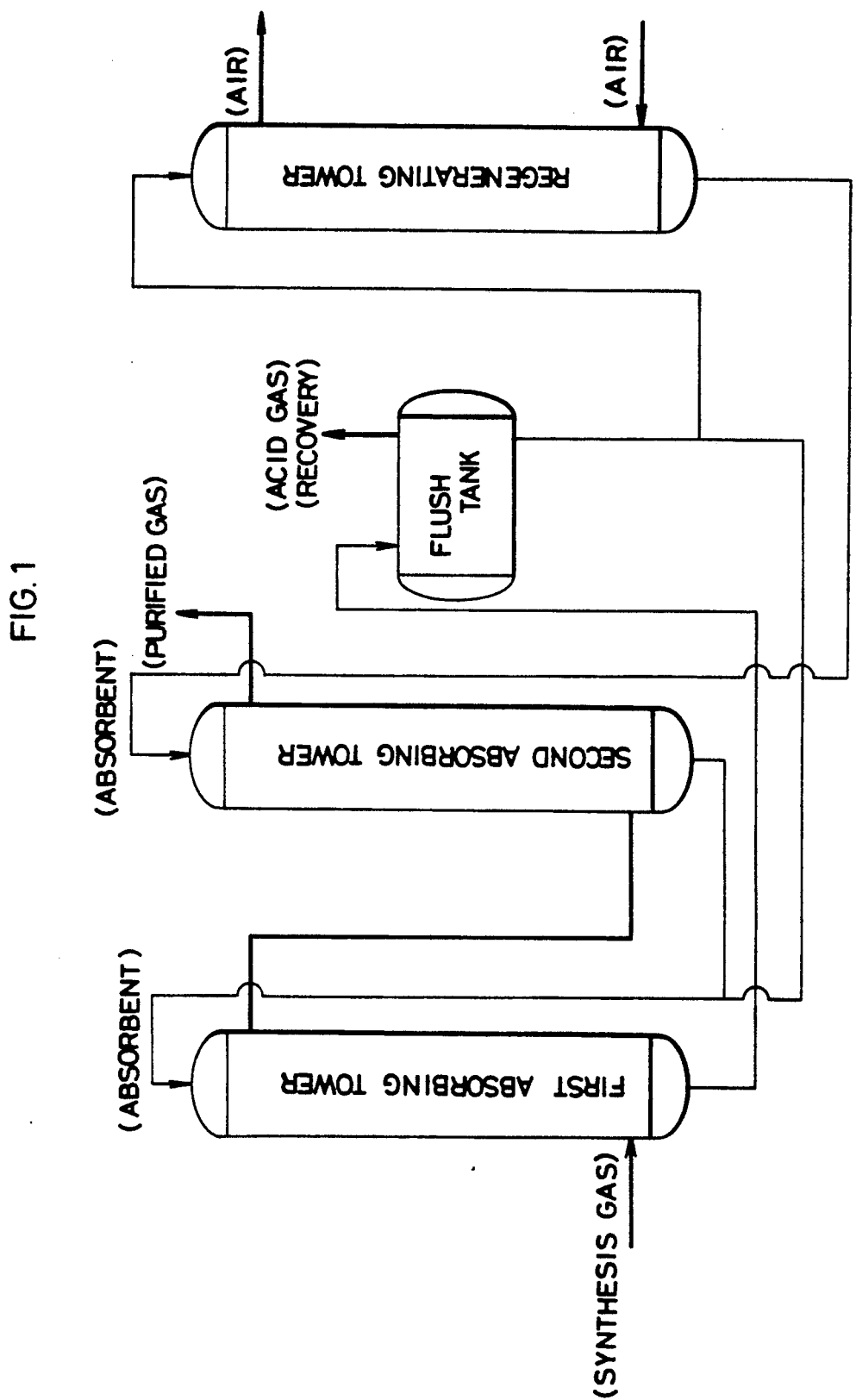
FIG. 1 is an outline of a process for absorbing and removing acid gases in a gas.

The present invention will be described in more detail by referring to the following examples but is not deemed to be limited to these examples.

SYNTHESIS EXAMPLES (i) [Synthesis of polyethylene glycol monomethyl ether]
(synthesis of raw material)

In a stainless-made autoclave (resistant to pressure of 20 kg/cm$^2$) of 1 liter equipped with a heating and cooling device, a stirrer, an inlet for ethylene oxide and $N_2$ gas and a thermometer were charged 128 g (4 mols) of methanol and 0.2 g of sodium hydroxide. Then, after the inside of the system was replaced with $N_2$ gas, the system was heated to 120° C. and 704 g (16 mols) of ethylene oxide was introduced into the autoclave over about 2 hours.

The reaction was exothermic and thus performed by controlling to 120°±5° C. while cooling. The pressure in the system was 10 kg/cm$^2$ at maximum.

The synthesized liquid was distilled by a distillation device to obtain 695 g of polyethylene glycol monomethyl ether.

| | |
|---|---|
| $CH_3O(CH_2CH_2O)_3H$ | 20.3 (wt %, hereafter the same) |
| $CH_3O(CH_2CH_2O)_4H$ | 62.5 |
| $CH_3O(CH_2CH_2O)_5H$ | 14.1 |
| $CH_3O(CH_2CH_2O)_6H$ | 2.3 |
| $CH_3O(CH_2CH_2O)_7H$ | 0.5 |
| $CH_3O(CH_2CH_2O)_8H$ | 0.2 |
| $CH_3O(CH_2CH_2O)_9H$ | 0.1 |

(ii) [Synthesis of polyethylene glycol dimethyl ether] (synthesis of component (A))

In a four-necked glass-made flask of 1 liter, equipped with a stirrer, a thermometer, an $N_2$ gas introducing line and a condenser was charged 594 g of polyethylene glycol monomethyl ether prepared in Synthesis Example (i). After the inside of the system was replaced with $N_2$ gas, the system was heated to 140° C.

To the autoclave was added 68 g of metallic sodium over 4 hours. Then the system was maintained at 140°±5° C. for 3 hours to complete the reaction. Next, 152 g of methyl chloride was added to the system over 7 hours, while keeping the inside of the system at 100 to 110° C. Thereafter, the system was maintained at the same temperature for 2 hours to complete the reaction. Next, the system was cooled to 30° C. and by-produced sodium chloride was separated by filtration to give 580 g of polyethylene glycol dimethyl ether synthetic liquid.

This synthetic liquid, 580 g, was distilled by a distillation device to obtain 507 g of polyethylene glycol dimethyl ether.

| | |
|---|---|
| $CH_3O(CH_2CH_2O)_3CH_3$ | 2.1 (wt %, hereafter the same) |
| $CH_3O(CH_2CH_2O)_4CH_3$ | 74.3 |
| $CH_3O(CH_2CH_2O)_5CH_3$ | 19.2 |
| $CH_3O(CH_2CH_2O)_6CH_3$ | 3.2 |
| $CH_3O(CH_2CH_2O)_7CH_3$ | 0.8 |
| $CH_3O(CH_2CH_2O)_8CH_3$ | 0.3 |
| $CH_3O(CH_2CH_2O)_9CH_3$ | 0.1 |

Properties of the polyethylene glycol dimethyl ether obtained herein are shown in Table 1 described below.

TABLE 1

| Properties of Polyethylene Glycol Dimethyl Ether Composition | | | | | |
|---|---|---|---|---|---|
| Solidifying Point (°C.) | Ignition Point (°C., COC) | Vapor Pressure (mmHg, 20° C.) | Specific heat (Cal/g° C.) | Density (g/cm$^3$, 20° C.) | Viscosity (cSt, 20° C.) |
| −40 | 147 | less than 0.01 | 0.571 | 1.020 | 4.15 |

The compositions for acid gas absorbent of the present invention can be obtained by mixing component (A) and component (B) in a predetermined ratio.

USE EXAMPLE

A preferred method for removing acid gases from a gaseous mixture containing acid gases such as carbon dioxide gas or hydrogen sulfide using the acid gas-absorbent composition in accordance with the present invention can be performed, for example, by procedures shown in FIG. 1.

FIG. 1 shows an outline of a process for absorbing and removing acid gases in a gas.

The device comprises, from the left of the figure, a first absorbing tower, a second absorbing tower, a flash tank and a regenerating tower.

A flow of the raw gas is shown by a bold solid line in the figure.

The absorbent is recycled in the system to use and its flow is shown by a narrow solid line in the figure.

Hereafter each step is described in detail.

(a) The absorbent composed mainly of polyethylene glycol dimethyl ether in accordance with the present invention is brought into contact with a gaseous mixture containing acid gases under pressure in a first, absorbing tower, thereby to absorb and remove almost all acid gases to prepare a half-purified gas.

(b) The half-purified gas from the first absorbing tower is brought into contact with the same absorbent substantially free from acid gases in a second absorbing tower under pressure to give the objective purified gas.

(c) The absorbent containing acid gases from the second absorbing tower is sent to the first absorbing tower.

(d) The absorbent containing the acid gases from the first absorbing tower is passed through a flash tank maintained under a pressure substantially lower than that of the first absorbing tower to liberate most of the acid gases.

(e) The acid gases liberated in the flash tank are recovered.

(f) Most of the absorbent containing some acid gases from the flash tank are sent to the first absorbing tower.

(g) The remaining part is sent to a regenerating tower and the absorbent which is regenerated and does not substantially contain acid gases is sent to the second absorbing tower in order to bring it again in contact with the gaseous mixture.

Evaluation on stability at high temperature

Each additive described below is added to polyethylene glycol dimethyl ether synthesized as described above. The mixture is heated at 100° C.±5° C. and a gaseous mixture of air and $CO_2$ is blown therein. The purity of polyethylene glycol dimethyl ether is measured by gas chromatography to evaluate stability.

(1) Method

Temperature: 100° C.±5° C.

Gas flow amount: A gaseous mixture of air and $CO_2$ is blown in an amount of 30 times the liquid amount/hr.

Measurement of purity: Conditions for gas chromatography are as follows.

Filler: PEG-HT (manufactured by Gas Chromatography Industry Co., Ltd., Japan)

Temperature: 100°–280° C. (10° C./min.), 300° C. at an inlet

Carrier gas: He

Detector: TCD (2) Additive: The addition amounts are all made 0.1 wt % based on polyethylene glycol dimethyl ether.

(i) 4,4'-Thiobis(6-tert-butyl-m-cresol)
(ii) 2,2'-Methylenebis(4-methyl-6-tert-butylphenol)
(iii) N,N'-Diphenyl-p-phenylenediamine
(iv) N-Isopropyl-N'-phenyl-p-phenylenediamine
(v) Mixture of (i) and (ii) in equimolar amounts
(vi) Mixture of (ii) and (iii) in equimolar amounts Reference (vii) Diisopropanolamine
(viii) None
(ix) Selexol Solvent (trademark, manufactured by Norton Company, USA)

FIG. 2 shows the results obtained by evaluation of stability at high temperature. The number of days for the test (logarithmic scale) is plotted on the abscissa and purity (%) of polyethylene glycol dimethyl ether tested is plotted on the vertical axis. (i) through (vi) are gas absorbents composed of the compositions of the present invention, (vii), (viii) and (ix) are cases of diisopropanolamine, no addition and Selexol Solvent, respectively.

The test results indicate that the gas absorbent composed of the present invention is markedly improved in stability, as shown in FIG. 2.

Acid gas absorbing properties

Utilizing the absorbing process shown in FIG. 1, efficiencies of the absorbent were examined with a raw gas containing acid gases.

Test Conditions (1) Composition of raw gas, wt %

| | |
|---|---|
| $CH_4$ | 0.4 |
| $H_2$ | 75.6 |
| $CO_2$ | 23.1 |
| $N_2$ | 0.9 |

(2) Conditions for each tower

TABLE 2

| | First Absorbing Tower | Second Absorbing Tower | Regenerating Tower |
|---|---|---|---|
| Amount of raw gas fed (liter/H) | 200 | 145–160 | — |
| Amount of absorbent fed (liter/H) | 13 | 10 | 10 |
| Temperature inside tower (°C.) | 5 | −3 | 110 |
| Amount of air blown (liter/H) | — | — | 200 |

(3) Composition of polyethylene glycol dimethyl ether: composition obtained in [synthesis of polyethylene glycol dimethyl ether] described above and shown in Table 1

Test results

TABLE 3

| | Composition of Purified Gas (%) | | | | | | | |
|---|---|---|---|---|---|---|---|---|
| | 100 Cycles[2] | | | | 1,000 Cycles[2] | | | |
| Composition | $CH_4$ | $H_2$ | $CO_2$ | $N_2$ | $CH_4$ | $H_2$ | $CO_2$ | $N_2$ |
| Additive[1] | | | | | | | | |
| a) 4,4'-Thiobis(6-tert-butyl-m-cresol) | 0.4 | 98.3 | 0.1 | 1.2 | 0.5 | 98.3 | 0.1 | 1.1 |
| b) N,N'-Diphenyl-p-phenylenediamine | 0.5 | 98.1 | 0.1 | 1.3 | 0.5 | 98.2 | 0.1 | 1.2 |
| c) N-Isopropyl-N'-phenyl-p-phenylene- | 0.5 | 98.2 | 0.1 | 1.2 | 0.4 | 98.2 | 0.1 | 1.3 |

TABLE 3-continued

| | Composition of Purified Gas (%) | | | | | | | |
|---|---|---|---|---|---|---|---|---|
| | 100 Cycles[2] | | | | 1,000 Cycles[2] | | | |
| Composition | $CH_4$ | $H_2$ | $CO_2$ | $N_2$ | $CH_4$ | $H_2$ | $CO_2$ | $N_2$ |
| diamine | | | | | | | | |
| d) Mixture of (a) and (b) in equimolar amounts | 0.4 | 98.2 | 0.1 | 1.3 | 0.4 | 98.4 | 0.1 | 1.1 |
| Reference: | | | | | | | | |
| Selexol Solvent | 0.5 | 98.1 | 0.1 | 1.3 | 0.5 | 98.0 | 0.4 | 1.1 |
| None | 0.5 | 98.2 | 0.1 | 1.2 | 0.5 | 94.9 | 3.6 | 1.0 |

Note (1) Amount of additive: 0.1 wt % based on polyethylene glycol dimethyl ether
Note (2) Cycle: number of cycle of the absorbent between the first absorbing tower and the regenerating tower The absorbent composed of the composition of the present invention was stable and no reduction in absorbing efficiency was noted.

What is claimed is:

1. A composition for acid gas absorbent comprising:
(A) 99.99-70 wt % of a polyethylene glycol dimethyl ether composition represented by the following formula:

$$CH_3O(C_2H_4O)_n CH_3$$

wherein n is an integer of 1 to 10; and
(B) 0.01 to 30 wt % of at least one of the following compounds indicated by the following formulas (1), (2) and (3):

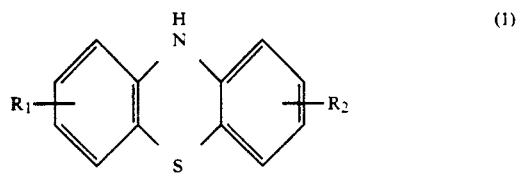

wherein $R_1$ and $R_2$ each independently represents hydrogen or hydrocarbon group having 1 to 20 carbons;

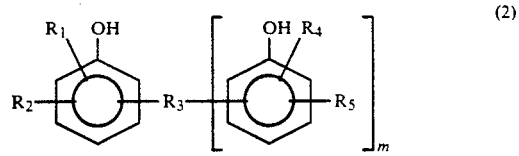

wherein $R_1$, $R_2$, $R_4$ and $R_5$ each independently represents H, a hydroxyl group or a hydrocarbon group having 1 to 10 carbons; $R_3$ represents sulfur or a hydrocarbon group having 1 to 10 carbons; and m is an integer of 0 to 2;

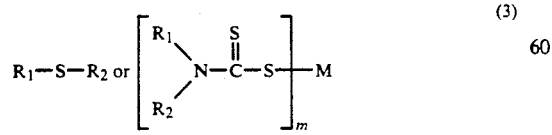

wherein $R_1$ and $R_2$ each independently represents a hydrocarbon group having 1 to 8 carbons, M is monovalent or bivalent metal, and m is an integer of 1 or 2;

with the proviso that compound (B) does not represent any compound selected from the group consisting of:
4,4'-Thiobis-(6-tert-butyl-m-cresol),
4,4'-Butyldene-bis-(3-methyl-6-tert-butylphenol), and
2,2'-Methylene-bis(4-methyl-6-tert-butylphenol).

2. A composition as claimed in claim 1, wherein the component (B) is Dibenzothiazine or derivatives thereof.

3. A composition as claimed in claim 1, wherein the component (B) is 4,4'-Butylidenebis(6-tert-butyl-m-cresol).

4. A composition as claimed in claim 1, wherein the component (B) is 2,6-Di-tert-butyl-p-cresol.

5. A composition as claimed in claim 1, wherein the component (B) is 2,5-Di-tert-butylhydroquinone.

6. A composition as claimed in claim 1, wherein the component (B) is 1,1'-Bis(4-hydroxy-phenyl)cyclohexane.

7. A composition as claimed in claim 1, wherein the component (B) is Nickel dibutyl dithiocarbamate.

8. A composition as claimed in claim 1, wherein the component (B) is dilauryl-3, 3'-thiodipropionate.

9. A composition for acid gas absorbent comprising the following components (A) and (B) in the distribution ratio of 99.99-70/0.01-30 (wt %) respectively:
(A) a polyethylene glycol dimethyl ether composition represented by the following formula $$CH_3O(C_2H_4O)_n CH_3$$

wherein n is an integer of 1 to 10; and
(B) a phenolic compound having a tert-butyl group bonded to the phenyl group, said compound being selected from the group consisting of 4,4'-Thiobis(6-tert-butyl-m-cresol), 4,4'-Butylidene-bis-(3-methyl-6-tert-butyl-phenol), and 2,2'-Methylenebis(4-methyl-6-tert-butylphenol).

10. A composition for acid gas absorbent comprising the following compounds (A) and (B) in the distribution ratio of 99.99-70/0.01-30 (wt %) respectively:
(A) a polyethylene glycol dimethyl ether composition represented by the following formula $$CH_3O(C_2H_4O)_n CH_3$$

wherein n is an integer of 1 to 10; and
(B) a compound comprising at least one of the following compounds (1-3):
1. 4,4'-Thiobis-(6-tert-butyl-m-cresol)
2. 4,4'-Butylidene-bis-(3-methyl-6-tert-butyl-phenol)

3. 2,2'-methylene-bis(4-methyl-6-tert-butylphenol).

11. A process for absorbing an acid gas by using as an absorbent a composition comprising the following components (A) and (B) in the distribution ratio of 99.99-70/0.01-30 (wt %) respectively:

(A) a polyethylene glycol dimethyl ether composition represented by the following formula $$CH_3O\ (C_2H_4O)_n\ CH_3$$

wherein n is an integer of 1 to 10; and (B) a phenolic compound having a tert-butyl group binding to a phenyl group selected from the group consisting of:
4,4'-Thiobis-(6-tert-butyl-m-cresol)
4,4'-Butylidene-bis-(3-methyl-6-tert-butylphenol)
2,2'-methylene-bis(4-methyl-6-tert-butylphenol).

said process comprising:
(a) contacting said absorbent to said gas mixture in an absorbing zone,
(b) forwarding the absorbent to a flashing tank in which the pressure is kept at a pressure which is less than that of the absorbing zone pressure, while draining gas from the flashing tank, and
(c) forwarding at least part of the absorbent from the flashing tank to a recovery zone as to contact with gases to recover at least part of said absorbent.

12. A composition for acid gas absorbent comprising the following compounds (A) and (B) in the distribution ratio of 99.99-70/0.01-30 (wt %) respectively:

(A) a polyethylene glycol dimethyl ether composition represented by the following formula $$CH_3O\ (C_2H_4O)_n\ CH_3$$

wherein n is an integer of 1 to 10; and (B) a compound comprising at least one of the following compounds (1)-(2):

(1) a phenolic compound represented by the following formula

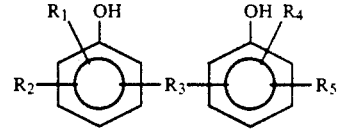

wherein $R_1$, $R_2$, $R_4$ and $R_5$ are the same or different and each represents a hydrogen atom or a group of the formula $C_xH_{(2x+1)}$, wherein x is an integer of from 1 to 7, and wherein $R_3$ is sulfur or a hydrocarbon group having 1 to 10 carbon atoms, (2) at least one sulfur compound selected from the group consisting of thiazoles, thioureas and thiurams, with the proviso that compound (B) does not represent any compound selected from the group consisting of:
4,4'-Thiobis-(6-tert-butyl-m-cresol),
4,4'-Butylidene-bis-(3-methyl-6-tert-butylphenol), and
2,2'-methylene-bis(4-methyl-6-tert-butylphenol).

* * * * *